US012739672B2

(12) United States Patent
Kim

(10) Patent No.: US 12,739,672 B2
(45) Date of Patent: Sep. 15, 2026

(54) ELECTROMAGNETIC FIELD (EMF) MEASUREMENT WITH MAXIMIZED NETWORK THROUGHPUT

(71) Applicant: VIAVI SOLUTIONS INC., Chandler, AZ (US)

(72) Inventor: Jong-Min Kim, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 339 days.

(21) Appl. No.: 18/468,344

(22) Filed: Sep. 15, 2023

(65) Prior Publication Data

US 2025/0063435 A1 Feb. 20, 2025

Related U.S. Application Data

(60) Provisional application No. 63/520,116, filed on Aug. 17, 2023.

(51) Int. Cl.

| | |
|---|---|
| ***H04W 24/08*** | (2009.01) |
| ***H04W 24/10*** | (2009.01) |
| ***H04W 28/02*** | (2009.01) |
| ***H04W 28/20*** | (2009.01) |
| ***H04W 72/1273*** | (2023.01) |

(52) U.S. Cl.

CPC .......... *H04W 24/08* (2013.01); *H04W 24/10* (2013.01); *H04W 28/0221* (2013.01); *H04W 28/20* (2013.01); *H04W 72/1273* (2013.01)

(58) Field of Classification Search

CPC . H04W 24/08; H04W 24/10; H04W 28/0221; H04W 28/20; H04W 72/1273

See application file for complete search history.

(56) References Cited

U.S. PATENT DOCUMENTS

| | | | | |
|---|---|---|---|---|
| 11,956,052 | B1 * | 4/2024 | Zhu .................... | H04B 7/06956 |
| 2014/0153661 | A1 * | 6/2014 | Hochwald ............ | H04B 7/0465 375/267 |

(Continued)

OTHER PUBLICATIONS

Chrysanthi Chountala et al., "Experimental Assessment of Electromagnetic Field Exposure from 5G Terminal Devices", 2023 European Conference on Networks and Communications & 6G Summit (EuCNC/6G Summit): Operational & Experimental Insights (OPE), Year 2023, pp. 543-548.

(Continued)

*Primary Examiner* — Redentor Pasia

(74) *Attorney, Agent, or Firm* — Mannava & Kang, P.C.

(57) ABSTRACT

Improved and accurate electromagnetic field (EMF) measurements of cellular network components such as a base station are performed by establishing a maximum network throughput connection with the desired base station, measuring a synchronization signal between the base station and a user equipment, and determining downlink location (e.g., from System Information Block 1 "SIB1"). Next, a resource block for a basic frame may be configured using timing information of the measured synchronization signal and a bandwidth part (BWP) to be measured in the configured resource block may be selected. The BWP may be selected based on the downlink location in some examples. Alternatively, a BWP corresponding to the maximum traffic may be selected. The EMF measurement may be performed for the configured resource block (selected BWP).

20 Claims, 8 Drawing Sheets

(56) References Cited

U.S. PATENT DOCUMENTS

| | | | | |
|---|---|---|---|---|
| 2017/0054465 | A1* | 2/2017 | Tesanovic | H04W 72/51 |
| 2019/0074889 | A1* | 3/2019 | Colombi | H01Q 3/24 |
| 2020/0177223 | A1* | 6/2020 | Fernando | H04B 1/3838 |
| 2020/0371146 | A1* | 11/2020 | Hochwald | G01R 29/0835 |
| 2021/0297959 | A1* | 9/2021 | Zhou | H04W 74/0833 |
| 2022/0295412 | A1* | 9/2022 | Hakola | H04L 5/1469 |
| 2022/0377678 | A1* | 11/2022 | Rahman | H04B 1/3838 |
| 2022/0416977 | A1* | 12/2022 | Farag | H04W 52/42 |
| 2023/0036243 | A1* | 2/2023 | Yuan | H04B 7/06964 |
| 2023/0067430 | A1* | 3/2023 | Yuan | H04W 24/10 |
| 2023/0093045 | A1* | 3/2023 | Shah | H04B 7/10 370/252 |
| 2023/0396279 | A1* | 12/2023 | Lu | H04W 52/34 |
| 2024/0162969 | A1* | 5/2024 | Kalbasi | H04B 7/0404 |
| 2024/0214949 | A1* | 6/2024 | Srinivasan | H04W 52/248 |
| 2024/0275418 | A1* | 8/2024 | Curtiss | H04W 52/225 |
| 2024/0298274 | A1* | 9/2024 | Nadakuduti | H04W 52/367 |
| 2024/0397413 | A1* | 11/2024 | Yuan | H04W 48/16 |
| 2025/0150988 | A1* | 5/2025 | Lim | H04L 5/0094 |
| 2025/0184925 | A1* | 6/2025 | Li | H04W 52/36 |
| 2025/0338157 | A1* | 10/2025 | Yuan | H04B 7/06968 |

OTHER PUBLICATIONS

Jose Fayos-Fernandez et al., “Effect of Spectrum Analyzer Filtering on Electromagnetic Dosimetry Assessment for UMTS Base Stations”, IEEE Transactions on Instrumentation and Measurement, vol. 57, No. 6, Jun. 2008, pp. 1154-1165.

European Patent Office, “The extended European search report for Application No. EP24177580.8”, dated Nov. 22, 2024, 8 pages.

EMF-Measurements at 5G NR Base Stations Using Active Antenna Arrays, pp. 6.

Lee at al., EMF Levels in 5G New Radio Environment in Seoul, Korea, date of publication Jan. 25, 2021, date of current version Feb. 3, 2021, vol. 9, 2021, pp. 19716-19722.

Stuhlfauth, 5G EMF Measurement Aspects, Rohde & Schwarz, Nov. 2020, pp. 72.

* cited by examiner

ELECTROMAGNETIC FIELD (EMF) MEASUREMENT WITH MAXIMIZED NETWORK THROUGHPUT

PRIORITY

This patent application claims priority to U.S. Provisional Patent Application No. 63/520,116, entitled "ELECTROMAGNETIC FIELD (EMF) MEASUREMENT WITH MAXIMIZED NETWORK THROUGHPUT," filed on Aug. 17, 2023. Disclosures of the Provisional patent application are incorporated by reference hereby.

TECHNICAL FIELD

This patent application is directed to cellular network testing, and more specifically, electromagnetic field (EMF) measurement of network base stations with maximized network throughput.

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. At a cell site, there may be a variety of signals depending on technology, e.g., 4G Long Term Evolution (LTE), 5G New Radio (NR), Dynamic Spectrum Sharing (DSS), etc. Additionally, other signals such as Citizens Broadband Radio Service (CBRS) and similar communication signals may also be present and potentially interfere with the cellular network signals.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

To assess the potential health risks of exposure to cellular communication (e.g., 5G) radiation, a variety of test techniques including electromagnetic field (EMF) measurement may be employed. Many countries have regulations that limit the amount of cellular communication radiation that people are allowed to be exposed to. EMF measurements and other techniques may help ensure that base stations are not emitting more radiation than is allowed. Furthermore, particular problems with cellular networks, such as poor signal strength or dropped calls, may be diagnosed using EMF measurements. However, network configuration and communication parameters may play a significant role in successful use of EMF measurement results in determining health risks or other cellular network problems.

In some examples of the present disclosure, improved and accurate EMF measurements of cellular network components such as a base station may be performed by establishing a maximum network throughput connection with the desired base station, measuring a synchronization signal between the base station and a user equipment, and determining downlink location (e.g., from System Information Block 1 "SIB1"). Next, a resource block for a basic frame may be configured using timing information of the measured synchronization signal and a bandwidth part (BWP) to be measured in the configured resource block may be selected. The BWP may be selected based on the downlink location in some examples. Alternatively, a BWP corresponding to the maximum traffic may be selected. The EMF measurement may be performed for the configured resource block (selected BWP).

Some advantages and benefits of the systems and methods described herein are readily apparent. For example, EMF measurements of cellular network components such as a base station with a maximum network throughput connection may provide more accurate radiation exposure, as well as faster detection of network problem sources. Other benefits and advantages may also be apparent.

Figure 1:
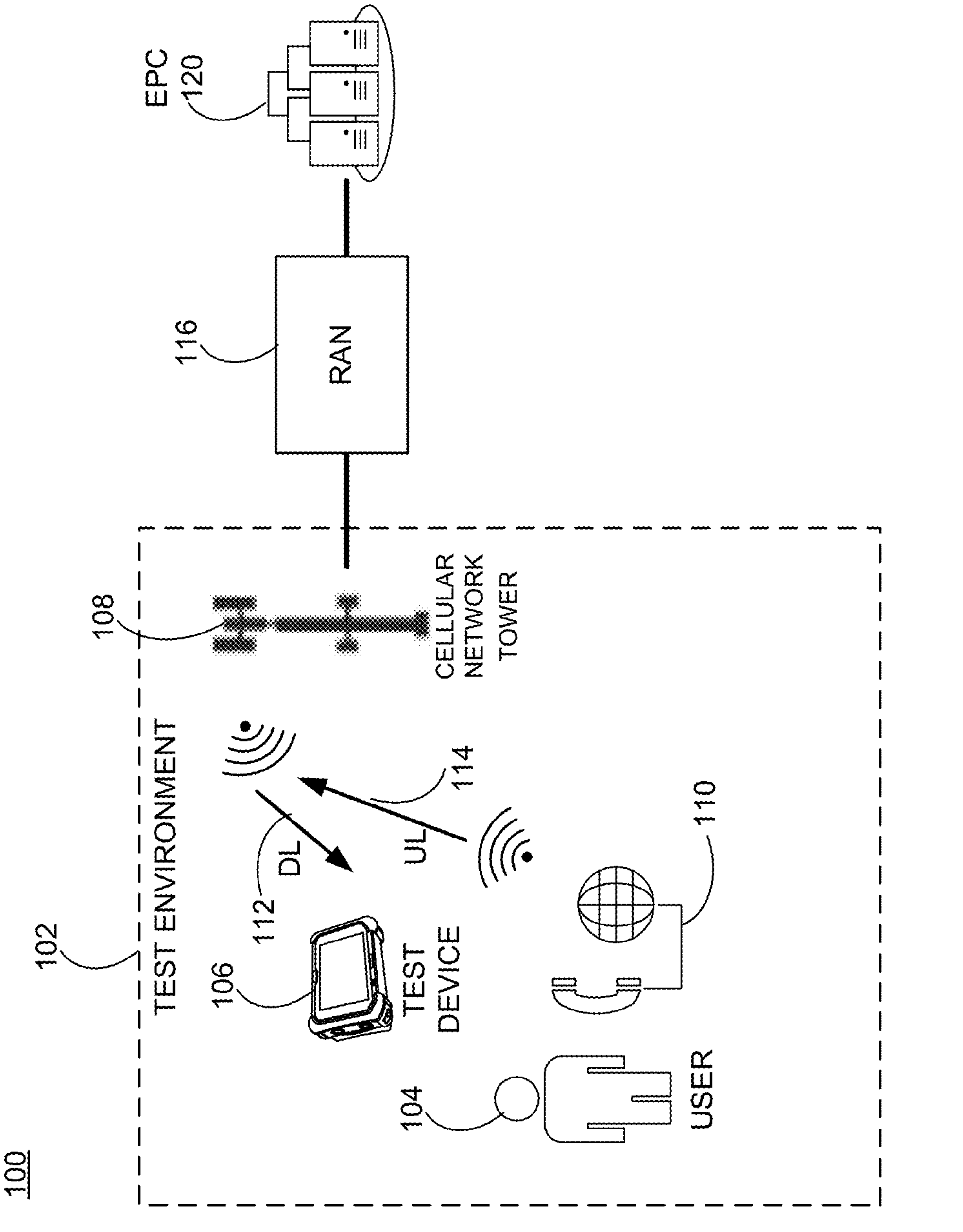
FIG. 1 illustrates a diagram of a test device in a cellular network test environment, according to an example.

FIG. 1 illustrates a diagram 100 of a test device 106 in a test environment 102, according to an example. As shown in the diagram 100, a user 104 may use user equipment (UE) 110 to communicate with other devices over the cellular network. Communication may include an uplink 114 to a cellular network tower 108 and a downlink 112 from the cellular network tower 108. A test device 106 to test and analyze signals from components at the cellular network tower 108 (e.g., a base station), as well as other signals which may come from other signal sources such as a radio tower, telecom signals, and others may be placed in close proximity with the user equipment (UE) 110. Thus, the test device 106 may measure a maximum EMF range assigned to the downlink 112 passed to user equipment (UE) 110 from the cellular network tower 108. The cellular network tower 108 may be part of a cell site and connected to backhaul via a radio access network (RAN) 116 and the backhaul may connect to Evolved Packet Core (EPC) 120.

A connection between the cellular network tower 108 and the rest of the world may be referred to as a backhaul link or simply backhaul. A backhaul may include wired, fiber optic and wireless components, such as microwave transmission equipment. In conventional 3G and 4G architectures, fronthaul is associated with a RAN 116 architecture including centralized base band units (BBUs), i.e., baseband controllers, and standalone remote radio heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the EPC 120.

In an example, the test environment 102 may include the cell site, which includes the cellular network tower 108 or cellular base station having antennas and electronic communications equipment to support cellular mobile device communication. The antennas and equipment are typically placed in connection with a radio mast or tower, and the equipment generally connects cell site air interfaces to wireline networks, which may include fiber optic cables and coaxial cables. Typically, the cell site may be connected to backhaul via the RAN 116 and the backhaul may connect to the EPC 120.

The RAN is the part of a mobile network that connects end-user devices, like smartphones, to the cloud. This is achieved by sending information via radio waves from end-user devices to a RAN's transceivers, and finally from the transceivers to the core network which connects to the global internet. Diagram 100 shows the test device 106 performing signal analysis. In an example, the user 104, such as a cellular service provider technician, may use the test device 106 to perform signal analysis for discovered carrier frequency and technology as well as discovered channels of selected technologies. Furthermore, interference hunting and beam centric electromagnetic field (EMF) testing on a selected carrier may be performed with the test device 106. In an example use case, the testing may be performed when the cell site is being installed, such as to ensure proper operation of the cell site with user devices, such as smartphones or other end user cellular devices. In another example use case, after installation, customers of the cellular service provider may be having technical issues, and the user 104 may use the test device 106 to check for signal interference from the other signal sources or other potential causes of the technical issues so the technical issues can be resolved.

As discussed herein, the test device 106 may be operable to perform an EMF analysis with the base station configured to maximum network throughput. Technologies employed by the network may include, but are not limited to, 4G LTE, 5G NR, 6G, and DSS. Additional examples of the technologies may include LTE-FDD, LTE-TDD, NR, DSS-FDD, DSS-TDD where FDD is frequency division duplex and TDD is time division duplex.

Accurate testing and analysis of EMF measurements of cellular network components such as a base station may be performed by establishing a maximum network throughput connection with the desired base station, measuring a synchronization signal between the base station and a user equipment, and determining downlink location (e.g., from System Information Block 1 "SIB1"). The downlink location may be used to identify the resource block allocated by the base station to the user at the measurement location. In some examples, the resource block location may be specified manually. A resource block for a basic frame may be configured using timing information of the measured synchronization signal and a bandwidth part (BWP) to be measured in the configured resource block may be selected. The BWP may be selected based on the downlink location in some examples. Alternatively, a BWP corresponding to the maximum network traffic may be selected. The EMF measurement may be performed for the configured resource block (selected BWP). With the configuration of the resource block, maximum network throughput may be accomplished by the user equipment (UE) requesting maximum download speed and/or maximum data download. Thus, the UE is used to derive the maximum EMF of the base station at the location of the test device.

Figure 2:
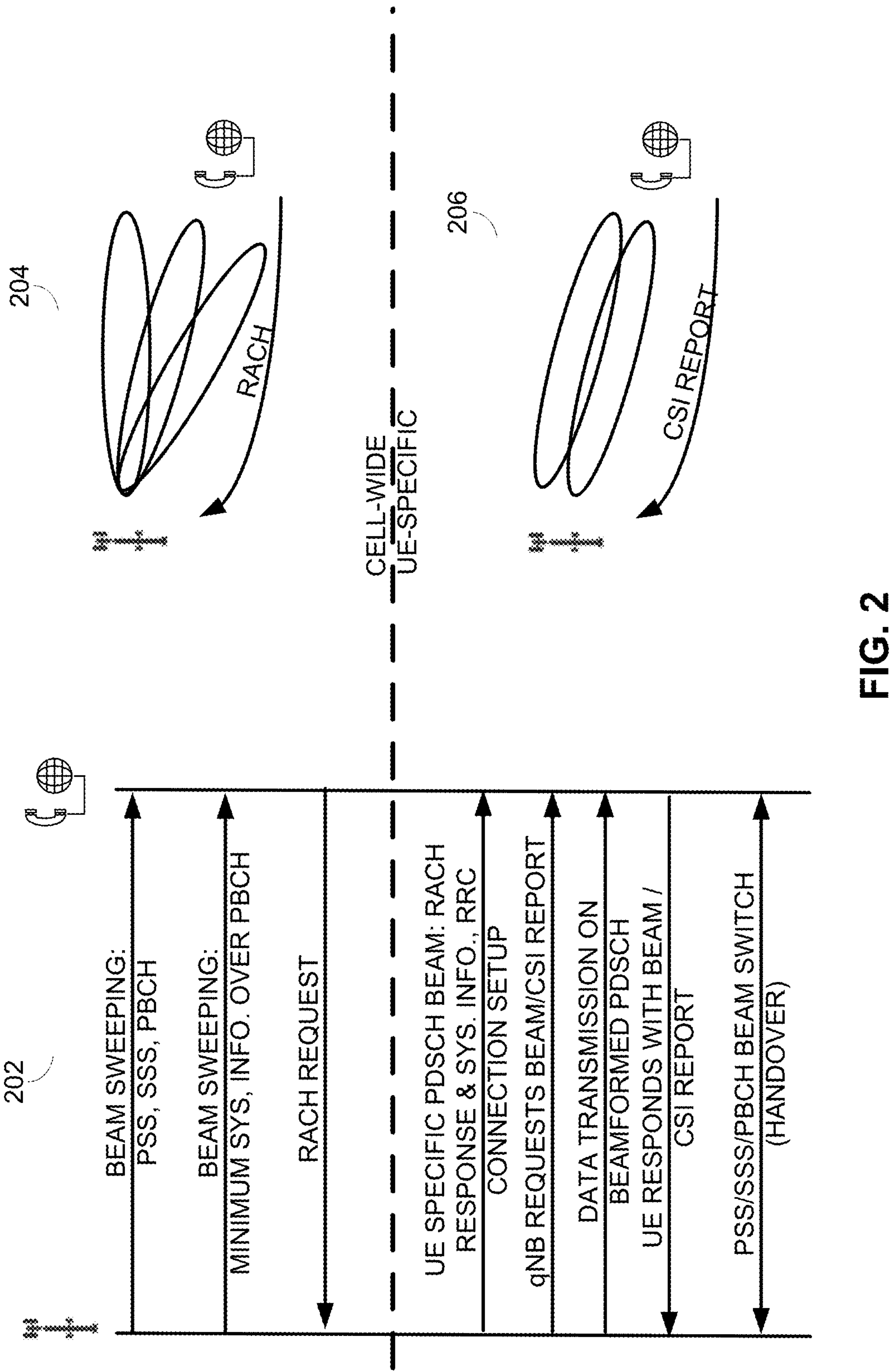
FIG. 2 illustrates a comparison of network configurations for cell-wide and user equipment specific measurements, according to an example.

FIG. 2 illustrates a comparison of network configurations for cell-wide and user equipment specific measurements, according to an example. Interactions between the network and the user equipment are shown in diagram 202 in FIG. 2. The interactions begin with beam sweeping by the base station with primary synchronization signal (PSS), secondary synchronization signal (SSS), and primary broadcast channel (PBCH). The beam sweeping also provides minimum system information over the PBCH. The UE responds to the base station with random access channel (RACH) request. This initial cell-wide operation is also illustrated in cell-wide configuration 204, where the UE may find the optimum beam (user beam) from the base station during synchronization and decode system information block (SIB) on that beam. The UE may notify the network (gNB) of the optimum synchronization signal block (SSB) by using the corresponding PRACH resource.

In a UE-specific operation, the base station may transmit a UE-specific physical downlink shared channel (PDSCH) beam, RACH response, system information, and radio resource control (RRC) connection setup information. The network (gNB) may also request beam/CSI reporting with data transmission on beamformed PDSCH. The UE may respond with beam/CSI report, which may be followed by primary synchronization signal (PSS), secondary synchronization signal (SSS), and primary broadcast channel (PBCH) beam switch (handover).

In the UE-specific configuration 206, the user equipment may request beamforming from a base station that transmits and receives between the user equipment and the network (gNB). However, channel state information reference signal (CSI-RS) demodulation may require substantial computational effort.

It should be appreciated that a test device to perform EMF measurements with maximized network throughput may be a spectrum analyzer and implemented with any number components, where certain functionality may be distributed among various components and sub-systems or performed by additional components or sub-systems. Furthermore, the test device may be any RF test device including, but not limited to, a spectrum analyzer, a cellular system monitoring device, an RF power analyzer, etc.

Figure 3A:
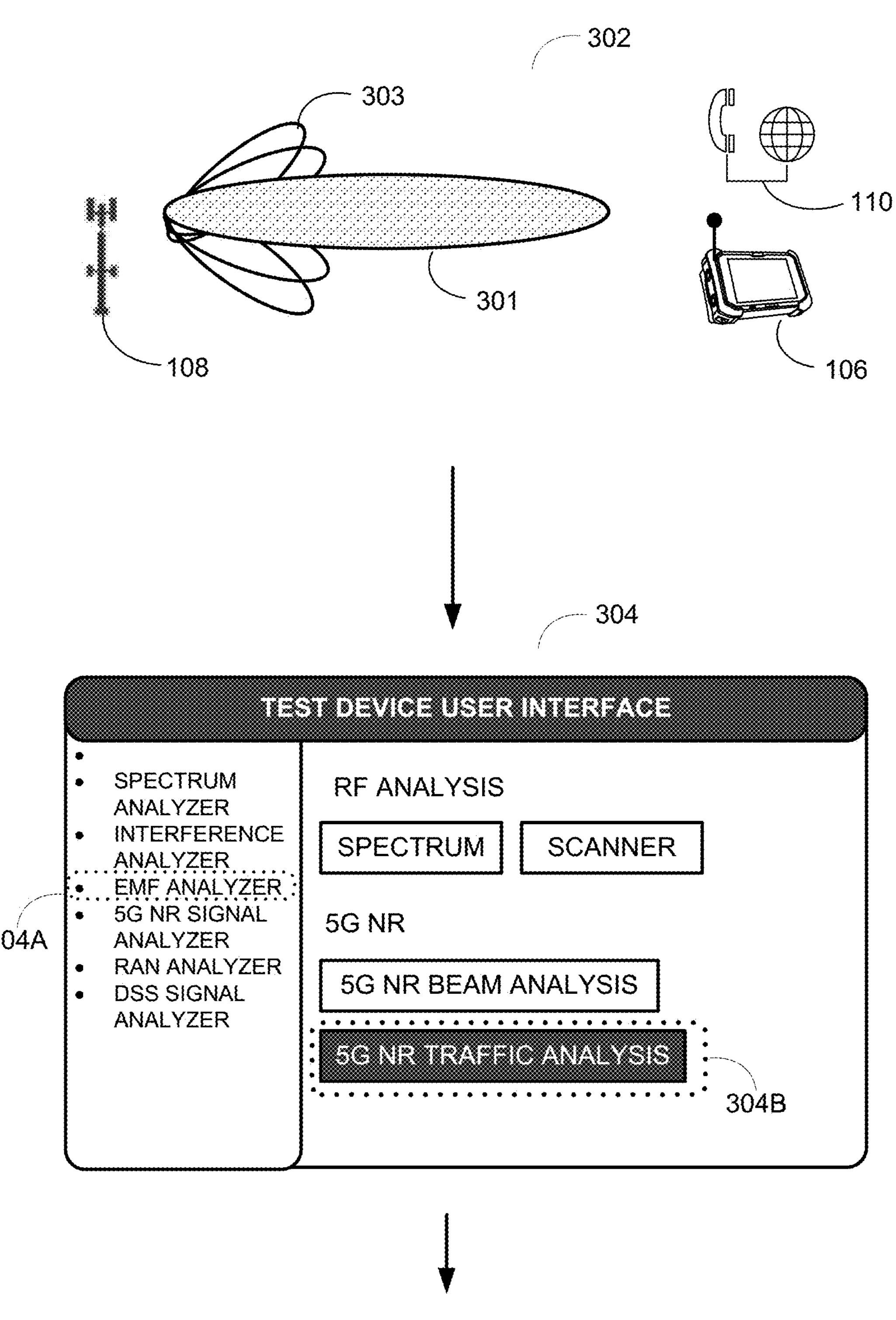
FIG. 3A illustrates instruction of a desired base station to generate maximum throughput with a user equipment and a screenshot of a test device to start electromagnetic field (EMF) analysis, according to an example.

FIG. 3A illustrates instruction of a desired base station to generate maximum throughput with a user equipment and a screenshot of a test device to start electromagnetic field (EMF) analysis, according to an example.

Figure 3B:
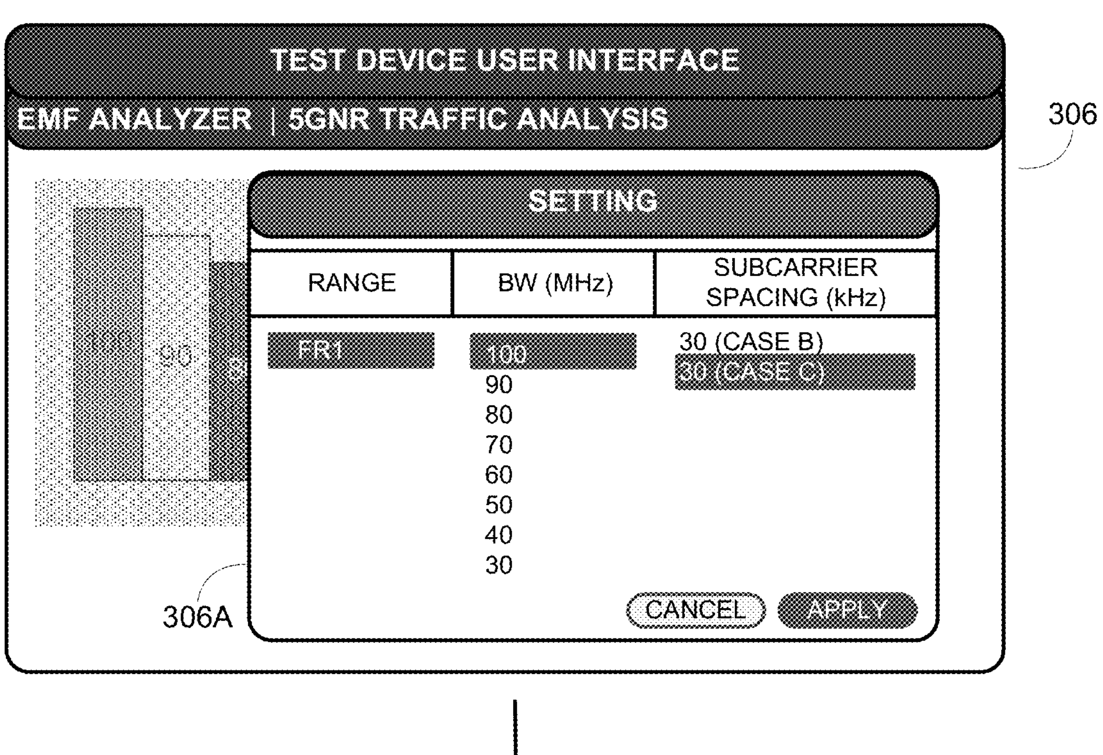
FIG. 3B illustrates screenshots of a test device measuring a synchronization signal and determining downlink location as part of EMF measurement with maximized network throughput, according to an example.
Figure 3B:
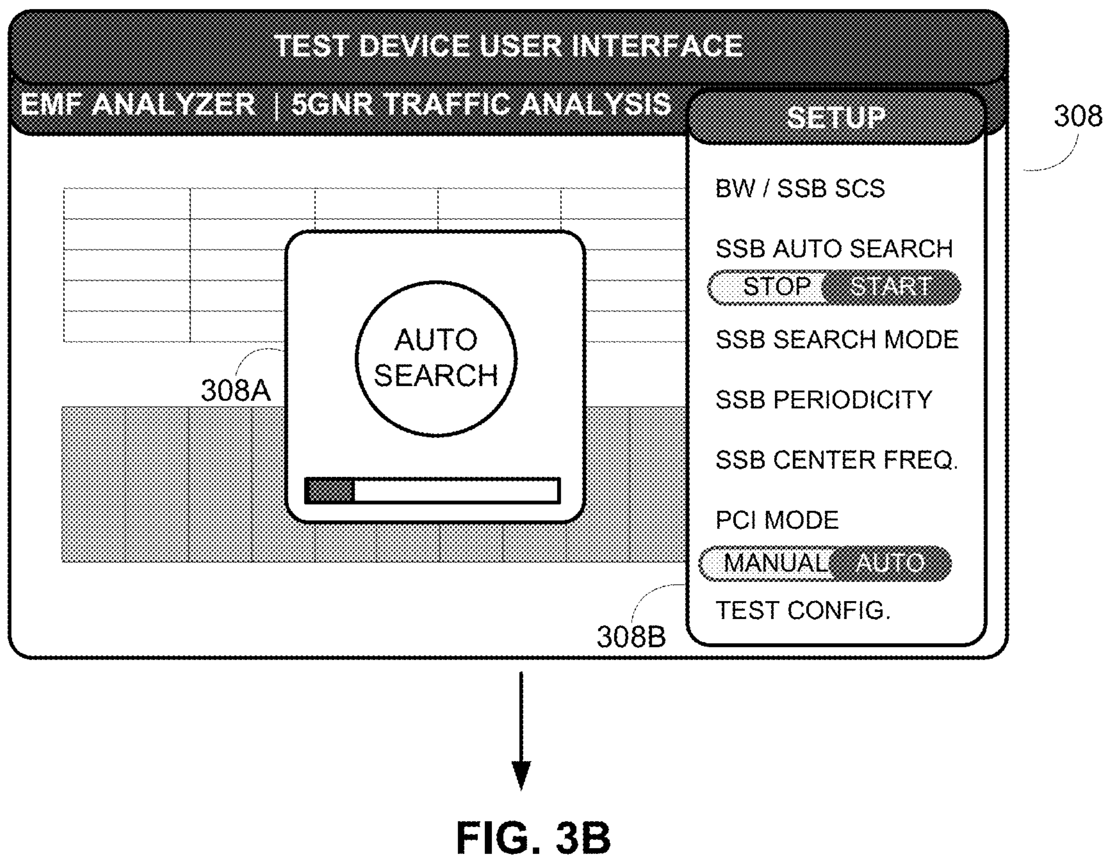
Figure 3C:
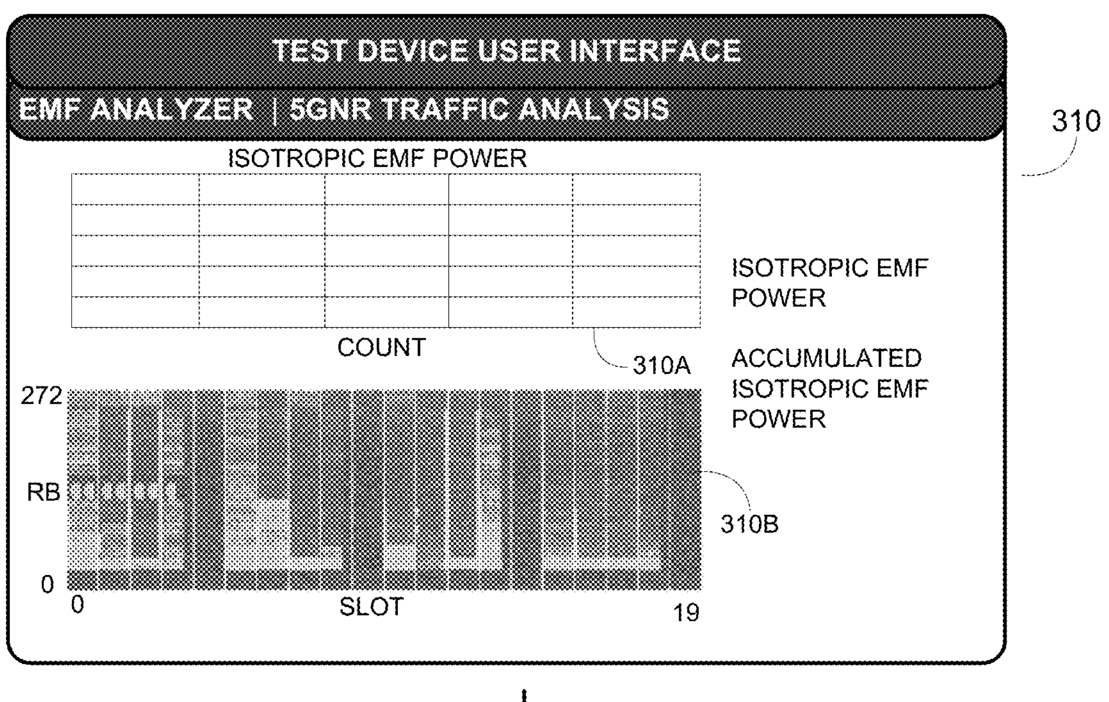
FIG. 3C illustrates screenshots of a test device performing electromagnetic field (EMF) analysis and configuration of the measurement, according to an example.
Figure 3C:
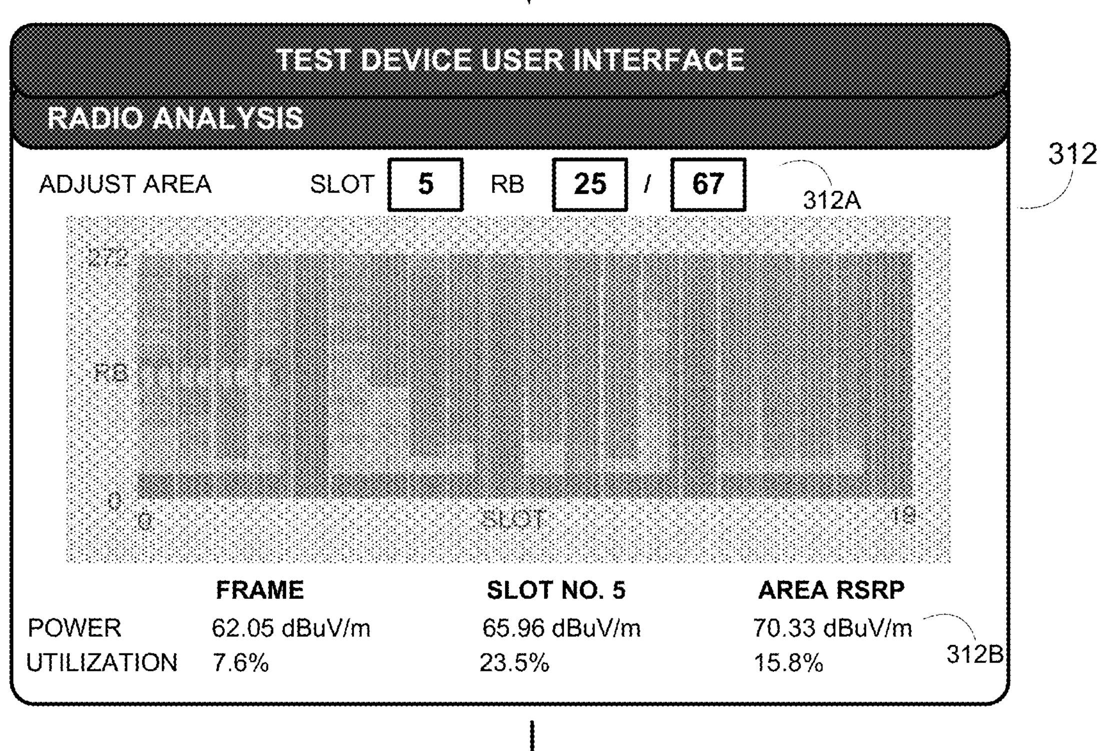
Figure 3D:
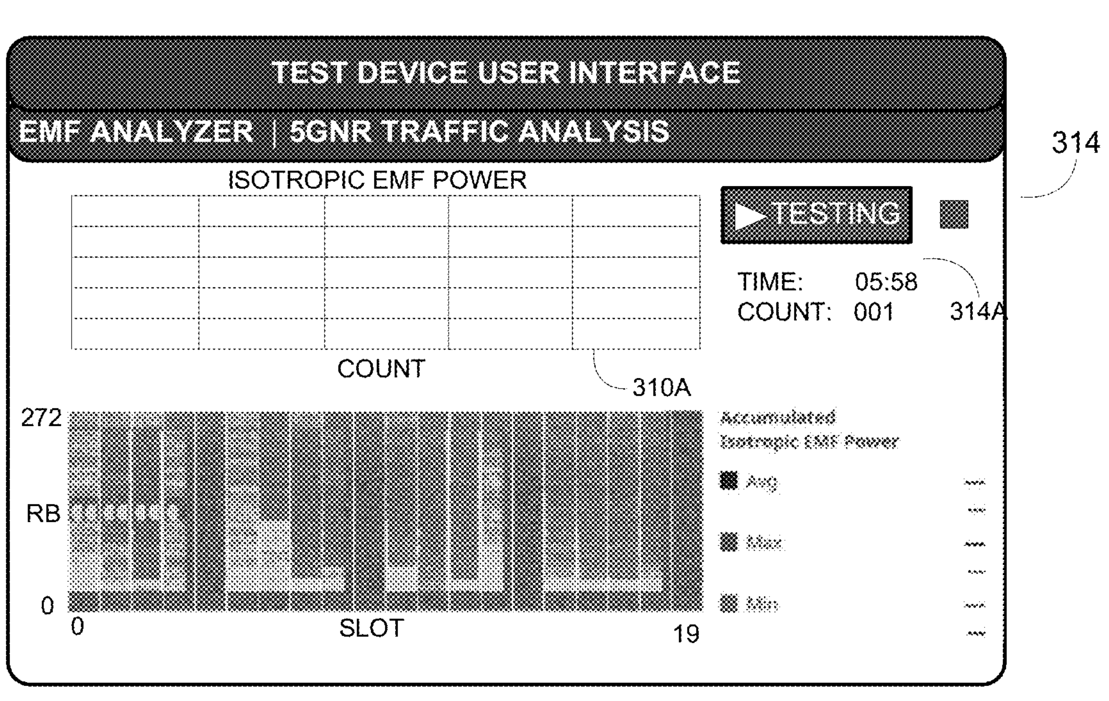
FIG. 3D illustrates screenshots of a test device performing EMF measurement following the network throughput maximization, according to an example.

Diagram 302 in FIG. 3A shows selection of the optimum beam 301 (among multiple beams 303) from the network cellular tower 108 (base station) during synchronization with UE 110 so that test device 106 in vicinity of the UE 110 can receive maximum EMF from the base station. Screenshot 304 in FIG. 3A is an example test device user interface showing test device setup. The test device 106 may be capable of performing multiple functions such as spectrum analysis, interference analysis, EMF analysis, 5G NR signal analysis, etc. Among available functions, EMF analysis 304A may be selected by a user and options associated with EMF analysis may be displayed. Among the displayed options, 5G NR traffic analysis 304B may be selected to create maximum network throughput from the base station. The UE 110 may request a particular beam, bandwidth part (BWP), and resource block. FIGS. 3B through 3D show further screenshots of the example test device configuring the communication and performing EMF measurements with the maximum network throughput.

FIG. 3B illustrates screenshots of a test device measuring a synchronization signal and determining downlink location as part of EMF measurement with maximized network throughput, according to an example.

Screenshot 306 shows settings selection on the test device user interface for 5G NR traffic analysis. Settings interface 306A allows selection of frequency range, bandwidth, and subcarrier spacing. Screenshot 308 shows synchronization signal block (SSB) auto search 308A being activated with the setting interface 308B for search parameters. The setting interface may, for example, allow selection of SSB search mode, SSB periodicity, SSB center frequency, manual or automatic search, etc. Additional system information block 1 (SIB1) information may be obtained to determine downlink (DL) location by the test device.

FIG. 3C illustrates screenshots of a test device performing electromagnetic field (EMF) analysis and configuration of the measurement, according to an example.

Screenshot 310 shows isotropic EMF power measurement results 310A and accumulated isotropic EMF power measurement results 310B. The accumulated isotropic EMF power measurement results 310B are shown per slot as average, maximum, and minimum EMF values. In some examples, a control element may be presented on the test device user interface, which upon activation may present setup controls for the accumulated isotropic EMF power measurement results 310B as shown in screenshot 312. The controls may allow adjustment of the area 312A by selecting number of slots, RB count, etc. The radio analysis interface screenshot 312 also shows quantitative information 312B such as power and utilization per frame, slot, and/or area.

In some examples, a resource block for a basic frame may be configured using timing information of the measured synchronization signal. Once the resource block is configured, the bandwidth part (BWP) to be measured in the configured resource block may be selected. When selecting the BWP, a range limited to the downlink (DL) section may be specified through SIB1 or user input. Alternatively, the BWP type may be determined and the BWP corresponding to the maximum traffic designated as the BWP to be measured.

FIG. 3D illustrates screenshots of a test device performing EMF measurement following the network throughput maximization, according to an example. Once the BWP (and resource block) are selected and the system configured to provide maximum network throughput, EMF measurement (s) may begin as shown in screenshot 314 providing minimum, maximum, and average accumulated isotropic EMF power values. Collected isotropic EMF power measurements may be displayed over time using a test control 314A. In some examples, regulatory limits may be displayed on the test device display allowing a tester to determine whether regulatory limits are complied with or exceeded.

Figure 4:
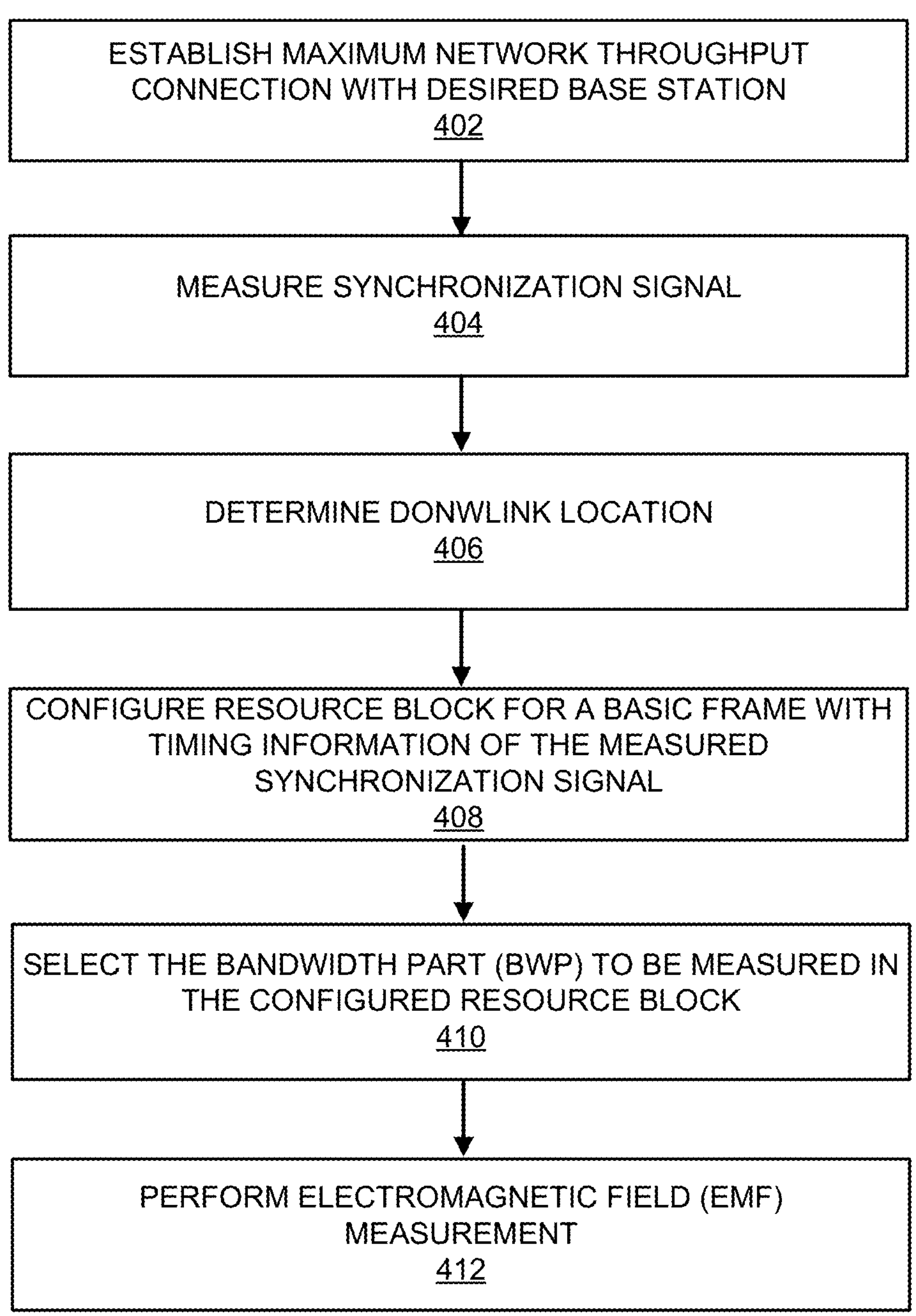
FIG. 4 illustrates a flow chart of a method for EMF measurement of network base stations with maximized network throughput, according to an example.

FIG. 4 illustrates a flow chart of a method 400 for EMF measurement of network base stations with maximized network throughput, according to an example. The method 400 is provided by way of example, as there may be a variety of ways to carry out the method described herein. Although the method 400 is primarily described as being performed by the test device 106 of FIG. 1, the method 400 may be executed or otherwise performed by one or more processing components of another system or a combination of systems. Each block shown in FIG. 4 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 402, the test device 106 may establish maximum network throughput connection with a desired base station (e.g., through a user equipment). Once the connection is established, the synchronization signal may be measured at block 404. Additional SIB1 information may also be obtained to determine downlink location at block 406.

At block 408, a resource block for a basic frame may be configured using timing information of the measured synchronization signal. This may be followed by selection of the bandwidth part (BWP) to be measured in the configured resource block at block 410. When selecting the BWP, a range limited to the downlink section may be specified through SIB1 or user input. Furthermore, a BWP corresponding to the maximum traffic may be selected as the BWP.

At block 412, EMF measurements may be performed with the maximum network throughput. In some examples, the EMF measurements may be compared to a radiation exposure limit and a report or an alert issued if the limit is exceeded.

Figure 5:
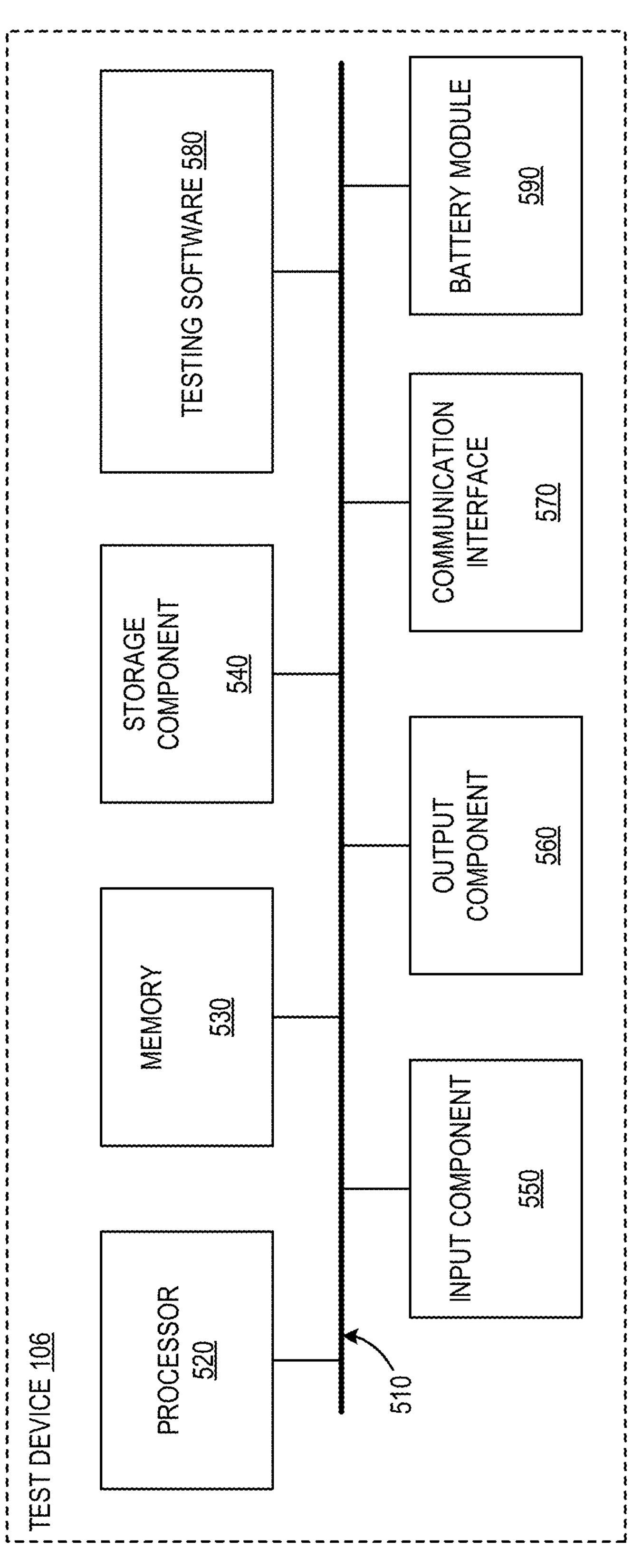
FIG. 5 illustrates a block diagram of the test device, according to an example.

FIG. 5 illustrates a block diagram of the test device 106, according to an example. As shown in block diagram, the test device 106 may include the components shown in FIG. 5. The test device 106 may include a bus 510, a processor 520, a memory 630, a storage component 540, an input component 550, an output component 560, a communication interface 570, and battery module 590.

Bus 510 includes a component that permits communication among the components of test device 106. Processor 520 may be implemented in hardware, firmware, or a combination of hardware and software. Processor 520 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 520 may include one or more processors capable of being programmed to perform a function. Memory 530 may include one or more memories such as a random access memory (RAM), a read only memory (ROM), and/or another type of dynamic or static storage device (e.g., a flash memory, a magnetic memory, and/or an optical memory) that store information and/or instructions for use by processor 520.

Storage component 540 stores information and/or software related to the operation and use of test device 106. For example, storage component 540 may include a hard disk (e.g., a magnetic disk, solid state disk, etc.) and/or another type of non-transitory computer-readable medium. Test device 106 may also include testing software 580 executed by the processor 520 to perform various functional tests.

The input component 550 may include a component that permits the test device 106 to receive information, such as via user input (e.g., a touch screen display, a keyboard, a keypad, a mouse, a button, a switch, and/or a microphone). Additionally, or alternatively, input component 550 may include a sensor for sensing information (e.g., a GPS component, an accelerometer, a gyroscope, and/or an actuator). Output component 560 includes a component that provides output information from the test device 106 (e.g., a display, a speaker, a user interface, and/or one or more light-emitting diodes (LEDs)). Output component 560 may include a display providing a GUI. Input component 550 and output component 560 may be combined into a single component, such as a touch responsive display, also known as an interactive display or a touchscreen.

Communication interface 570 may include a transceiver-like component (e.g., a transceiver and/or a separate receiver and transmitter) that enables test device 106 to communicate with other devices, such as via a wired connection, a wireless connection, or a combination of wired and wireless connections. Communication interface 570 may permit the test device 106 to receive information from another device and/or provide information to another device. For example, communication interface 570 may include an Ethernet interface, an optical interface, a coaxial interface, an infrared interface, an RF interface, a universal serial bus (USB) interface, a Wi-Fi interface, a cellular network interface, or the like.

Battery module 590 is connected along bus 510 to supply power to processor 520, memory 530, and internal components of the test device 106. Battery module 590 may supply power during field measurements by the test device 106. Battery module 590 may permit the test device 106 to be a portable.

The test device 106 may perform one or more processes described herein. The test device 106 may perform these processes by processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may instruct processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 106 may include components other than shown. For example, the test device 106 may include a spectrum analyzer and power meter for performing tests described above. The number and arrangement of components shown in FIG. 5 are provided as an example. In practice, the test device 106 may include additional components, fewer components, different components, or differently arranged components than those shown in FIG. 5. Additionally, or alternatively, a set of components (e.g., one or more components) of the test device 106 may perform one or more functions described as being performed by another set of components of the test device 106.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce EMF measurement errors and inaccuracies, and thereby facilitate more reliable and accurate measurements, specifically for maximized network throughput. It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations.

Many variations are possible within the scope of the disclosure, which is intended to be defined by the following claims—and their equivalents—in which all terms are meant in their broadest reasonable sense unless otherwise indicated.

The invention claimed is:

1. A method to perform electromagnetic field (EMF) measurements in a cellular network, the method comprising:
establishing a maximum network throughput connection with a base station;
measuring, by a test device, a synchronization signal between the base station and a user equipment (UE) over the established connection;
configuring a resource block for a basic frame with timing information from the measured synchronization signal;
selecting a bandwidth part (BWP) to be measured in the configured resource block; and
performing, by the test device, the EMF measurements for the selected BWP and the configured resource block.

2. The method of claim 1, further comprising:
obtaining information from a system information block 1 (SIB1) associated with the measured synchronization signal; and
determining a location of a downlink based on the obtained information.

3. The method of claim 2, further comprising:
when selecting the BWP, specifying a range limited to the location of the downlink.

4. The method of claim 3, wherein the range is specified through the SIB1.

5. The method of claim 3, wherein selecting the BWP further comprises:
selecting the BWP corresponding to a maximum network traffic.

6. The method of claim 1, wherein establishing the maximum network throughput connection with the base station comprises:
selecting a user beam from the base station with maximum network throughput.

7. The method of claim 1, wherein performing the EMF measurements comprises:
measuring one or more of a minimum EMF, a maximum EMF, or an average EMF.

8. The method of claim 1, further comprising:
comparing the EMF measurements to a radiation exposure limit.

9. A test device to perform electromagnetic field (EMF) measurements in a cellular network, the test device comprising:
an input component to receive cellular communication signals associated with an established communication from a base station;
an interactive display to present the EMF measurements and to receive configuration input; and
a processor coupled to the input component and the interactive display, the processor is to:
establish a maximum network throughput connection with the base station;
measure a synchronization signal between the base station and a user equipment (UE) over the established connection;
configure a resource block for a basic frame with timing information from the measured synchronization signal;
select a bandwidth part (BWP) to be measured in the configured resource block; and
perform the EMF measurements for the selected BWP and the configured resource block.

10. The test device of claim 9, wherein the processor is further to:
measure isotropic EMF power from the base station over a predefined time period; and
determine accumulated isotropic EMF power based on measurements of the isotropic EMF power over the predefined time period.

11. The test device of claim 10, wherein the processor is further to:
display the accumulated isotropic EMF power on the interactive display; and
enable adjustment of an area of the displayed accumulated isotropic EMF power.

12. The test device of claim 9, wherein the processor is further to:
compare the EMF measurements to a radiation exposure limit.

13. The test device of claim 11, wherein the accumulated isotropic EMF power is displayed on the interactive display as a minimum EMF, a maximum EMF, and an average EMF.

14. The test device of claim 9, wherein the processor is further to:
obtain information from a system information block 1 (SIB1) associated with the measured synchronization signal;
determine a location of a downlink based on the obtained information; and
select the BWP based on a range limited to the location of the downlink.

15. The test device of claim 9, wherein the BWP in the configured resource block is selected to correspond to a maximum network traffic by the UE.

16. The test device of claim 9, wherein the test device is in a vicinity of the UE.

17. A non-transitory computer-readable storage medium having executable instructions stored thereon, which when executed cause a processor of a test device to perform electromagnetic field (EMF) measurements in a cellular network, comprising causing the processor to:
establish a maximum network throughput connection with a base station;
measure a synchronization signal between the base station and a user equipment (UE) over the established connection;
configure a resource block for a basic frame with timing information from the measured synchronization signal;
select a bandwidth part (BWP) to be measured in the configured resource block; and
perform the EMF measurements for the selected BWP and the configured resource block.

18. The non-transitory computer-readable storage medium of claim 17, wherein the executable instructions further cause the processor to:
obtain information from a system information block 1 (SIB1) associated with the measured synchronization signal;
determine a location of a downlink based on the obtained information; and
select the BWP based on a range limited to the location of the downlink.

19. The non-transitory computer-readable storage medium of claim 17, wherein the executable instructions further cause the processor to:
measure one or more of a minimum EMF, a maximum EMF, or an average EMF.

20. The non-transitory computer-readable storage medium of claim 17, wherein the executable instructions further cause the processor to:

compare the EMF measurements to a radiation exposure limit.

* * * * *